United States Patent
Viala et al.

(10) Patent No.: US 11,037,717 B2
(45) Date of Patent: Jun. 15, 2021

(54) INTEGRATED MAGNETIC DEVICE WITH VARIABLE INDUCTANCE AND METHOD FOR MAKING SUCH A DEVICE

(71) Applicant: COMMISSARIAT A L'ENERGIE ATOMIQUE ET AUX ENERGIES ALTERNATIVES, Paris (FR)

(72) Inventors: Bernard Viala, Sassenage (FR); Herve Achard, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 156 days.

(21) Appl. No.: 15/988,097

(22) Filed: May 24, 2018

(65) Prior Publication Data

US 2018/0342343 A1 Nov. 29, 2018

(30) Foreign Application Priority Data

May 29, 2017 (FR) ...................... 17 54698

(51) Int. Cl.
*H01F 21/08* (2006.01)
*H01F 10/32* (2006.01)
(Continued)

(52) U.S. Cl.
CPC ......... *H01F 21/08* (2013.01); *H01F 10/3218* (2013.01); *H01F 41/32* (2013.01); *H02N 2/0075* (2013.01); *H01F 27/022* (2013.01)

(58) Field of Classification Search
CPC .. H01F 17/0006; H01F 21/08; H01F 10/3218; H01F 41/32; H01F 27/022; H01F 27/2804; H01F 2017/0073; H02N 2/0075
(Continued)

(56) References Cited

U.S. PATENT DOCUMENTS 5,956,073 A * 9/1999 Jin ........................... H01F 3/10
336/160
8,916,391 B2 12/2014 Viala et al.
(Continued)

FOREIGN PATENT DOCUMENTS

EP 2 323 142 A1 5/2011
FR 2 905 793 A1 3/2008
(Continued)

OTHER PUBLICATIONS

French Preliminary Search Report dated Feb. 20, 2018 in French Application 17 54698 filed on May 29, 2017 (with English Translation of Categories of Cited Documents).
(Continued)

*Primary Examiner* — Mang Tin Bik Lian
(74) *Attorney, Agent, or Firm* — Oblon, McClelland, Maier & Neustadt, L.L.P.

(57) ABSTRACT

Method for producing an integrated magnetic device with variable inductance, comprising:
a) making of a piezoelectric element on a first substrate;
b) making of a first electrically conductive element on a face of the piezoelectric element, and fastening of the ends of the piezoelectric element to a second substrate such that the piezoelectric element is arranged facing a cavity formed between the second substrate and the piezoelectric element, the first electrically conductive element being arranged in and/or against the second substrate or against the piezoelectric element;
c) removing of the first substrate;
d) making of a second electrically conductive element on another face of the piezoelectric element;
and further comprising the making of an electrical and/or magnetic coupling of the first and second electrically conductive elements, and the making of a magnetic
(Continued)

element arranged against and/or in the piezoelectric element and between the electrically conductive elements.

7 Claims, 7 Drawing Sheets

(51) Int. Cl.
  *H01F 41/32* (2006.01)
  *H02N 2/00* (2006.01)
  *H01F 27/02* (2006.01)
(58) Field of Classification Search
  USPC .............................. 336/200, 232, 146, 147
  See application file for complete search history.

(56) References Cited

U.S. PATENT DOCUMENTS

| | | | |
|---|---|---|---|
| 2008/0068759 A1* | 3/2008 | Orlando | H01F 21/08 360/294.4 |
| 2010/0151797 A1 | 6/2010 | Viala et al. | |
| 2011/0116194 A1* | 5/2011 | Viala | H01F 21/08 360/294.4 |
| 2014/0253272 A1 | 9/2014 | Sun | |
| 2014/0340183 A1* | 11/2014 | Nakada | G11B 5/3909 336/30 |
| 2015/0228394 A1* | 8/2015 | Nakada | H01L 43/08 336/105 |

FOREIGN PATENT DOCUMENTS

| | | |
|---|---|---|
| FR | 2 939 990 | 6/2010 |
| JP | 2007-142157 | 6/2007 |
| JP | 2007142157 A * | 6/2007 |

OTHER PUBLICATIONS

Mario Baum, et al., "Eutectic Wafer Bonding for 3-D Integration," Electronic System-Integration Technology Conference (ESTC), 2010, $3^{rd}$ IEE, 6 Pages.
Sumant Sood, "Advanced Metal-Eutectic Bonding for High Volume MEMS WLP," IEEE Mems Bay Area Meeting, Feb. 2014, 30 Pages.
K. Garello, et al., "Magnetodielectric Thin Film Heterostructure With High Permeability and Permittivity," IEEE Transactions on Magnetics, vol. 45, No. 10, Oct. 2009, pp. 4325-4328 4 Pages.
Hwaider Lin, et al., "Integrated Magentics and Multiferroics for Compact and Power-Efficient Sensing. Memory, Power, RF, and Microwave Electronics," IEEE Transactions on Magnetics, vol. 52, No. 7, Jul. 2016, 8 Pages.
G.A. Lebedev, et al., "Electric field controlled magnetization rotation in exchange biased antiferromagnetic/ferromagnetic/piezoelectric composites," Applied Physics Letters, 99, 2011, 4 Pages.

* cited by examiner

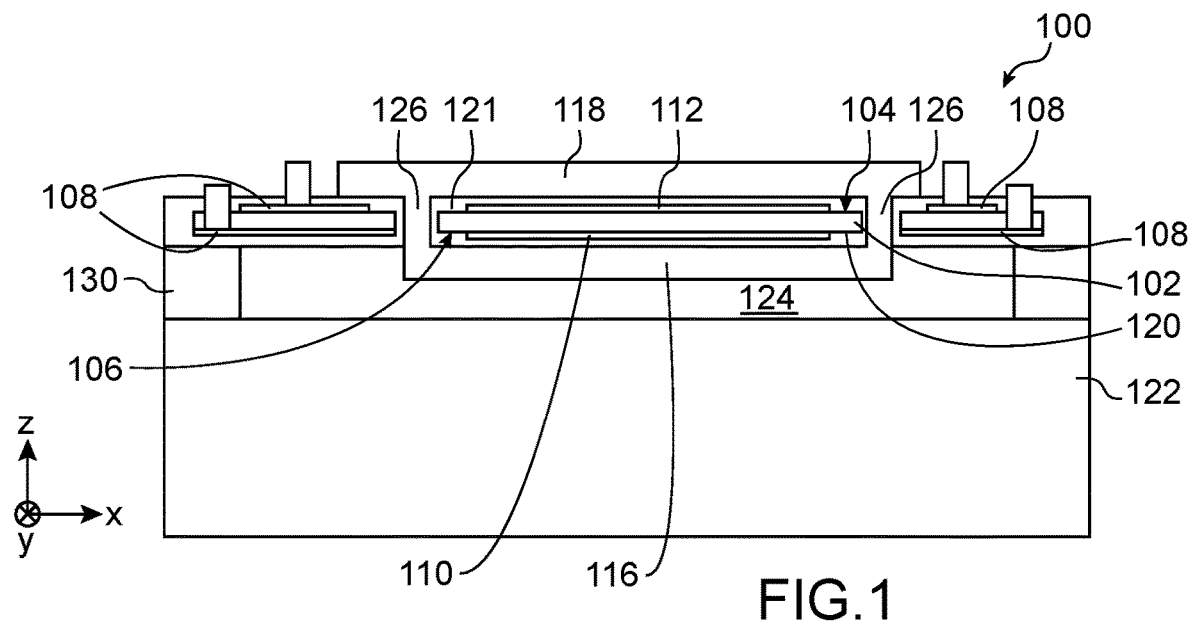
FIG.1
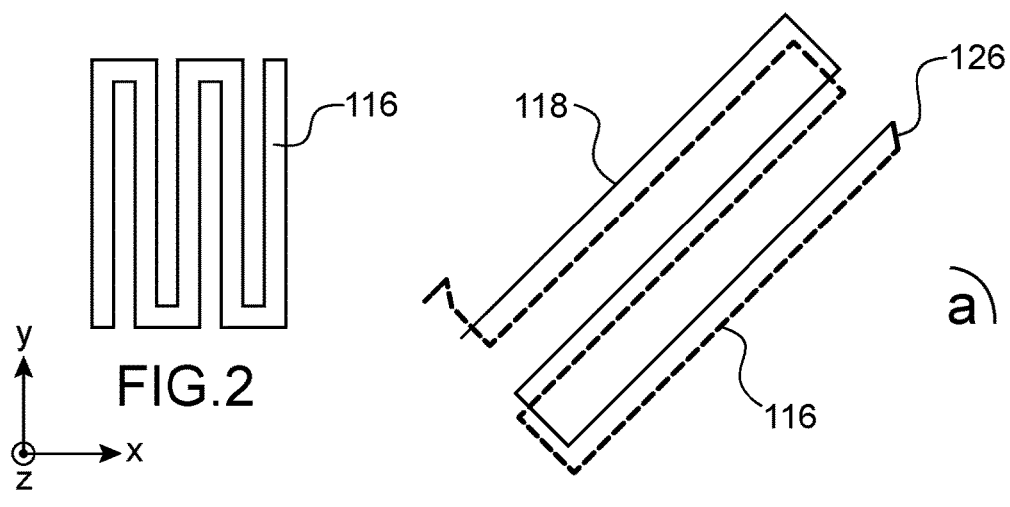
FIG.2
FIG.3
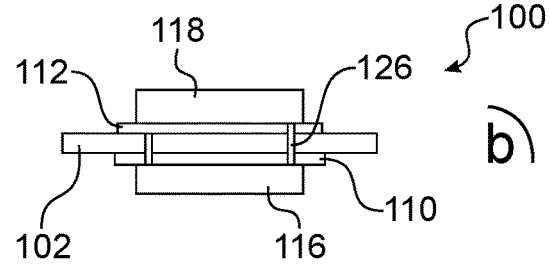

INTEGRATED MAGNETIC DEVICE WITH VARIABLE INDUCTANCE AND METHOD FOR MAKING SUCH A DEVICE

TECHNICAL FIELD AND PRIOR ART

The invention relates to the field of integrated magnetic devices with variable inductance, corresponding advantageously to a RF component (radiofrequency) with variable inductance combining a piezoelectric element with one or several magnetic elements as well as electrically conductive elements arranged on either side of the piezoelectric element, as well as a method for making such a device.

In the RF field, and in particular that of mobile telephony, variable RF components are increasingly sought to reduce the number of circuits present in portable telephones. The fifth generation of standards for mobile telephony, called 5G, provides the concomitance of more than ten standards in a single device which cannot comprise as many antennas and transmission/reception circuits. The most popular solution is to increase the adaptation possibilities of the electronic circuits used, which currently in practice are based only on the use of variable capacitance. However, the results obtained by using only variable capacitance are insufficient and it is becoming necessary to propose variable inductances that have a sufficiently substantial quality factor, low consumption, small dimensions and good reliability.

Document FR 2 905 793 describes the making of an integrated magnetic device on a substrate and with variable inductance comprising a beam formed from a piezoelectric material and whereon is arranged a magnetic element. By varying the voltage applied on the piezoelectric material, the beam is subjected to deformations in traction or in compression which place the magnetic element under stress. The stresses applied on the magnetic element generate modifications in the value of its permeability and in the inductance formed by this device. The embodiment described in this document is said to be "monolithic", i.e. all of the layers are stacked and etched successively on a single substrate.

With such an embodiment, it is difficult to make electrically conductive elements on either side of the beam of piezoelectric material, in order to form for example a winding, or solenoid, around this beam, and obtain a substantially symmetrical structure on each side of the beam. This limits the variation in inductance that can be reached. Furthermore, releasing the beam implemented at the end of the method requires the making of release holes through the beam of piezoelectric material, which reduces its stiffness and imposes constraints on the geometrical characteristics of this beam. Another disadvantage is linked to the high temperatures required by the deposition of the piezoelectric material (which corresponds to PZT) and which, in the embodiment described in this document, make this method incompatible with the presence of a magnetic element under the beam. The structure obtained with such a method and therefore asymmetrical in light of the presence of a magnetic element on only one side of the beam. Finally, these temperatures hinder the presence of conductive materials under the beam.

Furthermore, the embodiment described in this document does not make it possible to make the electrically conductive elements in a spaced manner with respect to the piezoelectric element.

DISCLOSURE OF THE INVENTION

Thus there is a need to propose a method for making an integrated magnetic device with variable response, using the magnetostrictive effect, not having at least one portion of the disadvantages mentioned hereinabove, and allowing in particular for the making of a magnetic device comprising electrically conductive elements arranged on either side of the piezoelectric element, which do not require the making of release holes through the piezoelectric element of the device, and which allow for the making of a device comprising a magnetic element on one or two opposite sides of the piezoelectric element.

For this, one embodiment proposes a method for making an integrated magnetic device with variable inductance, comprising at least the implementation of the following steps:

a) making of a piezoelectric element on a first substrate such that a second face of the piezoelectric element is arranged on the side of the first substrate;

b) making of a first electrically conductive element on the side of a first face, opposite the second face, of the piezoelectric element, and fastening of the ends of the piezoelectric element to a second substrate such that the first face of the piezoelectric element is arranged facing a first cavity formed between a portion of the second substrate and the piezoelectric element, the first electrically conductive element being arranged in and/or against the second substrate, or against the piezoelectric element;

c) removing of at least one portion of the first substrate;

d) making of a second electrically conductive element on the side of the second face of the piezoelectric element;

and further comprising the making of an electrical and/or magnetic coupling of the first and second electrically conductive elements, and the making of at least one magnetic element arranged against and/or in the piezoelectric element and between the first and second electrically conductive elements.

Thanks to the use of the first and second substrates to turn over the piezoelectric element during the method, the first and second opposite faces of the piezoelectric element can be accessed during the making of the device, which allows for the making of the first and second electrically conductive elements on each side of the piezoelectric element. The value of the inductance obtained with such a device is therefore more substantial than when a single electrically conductive element is present on the side of a single face of the piezoelectric element coupled to the magnetic core of the device.

This also makes possible the integration of a magnetic element possibly on each side of the piezoelectric element, and therefore the realisation of a structure with symmetrical variable inductance comprising the piezoelectric element with each side a magnetic element and an electrically conductive element. The device obtained as such makes it possible to have a greater variation in the inductance than in the case of a non-symmetrical structure that does not comprise the same elements on each side of the piezoelectric element.

In this method, the high temperatures required by the deposition of the piezoelectric material are not problematic since the electrically conductive elements and the magnetic element or elements are made after the making of the piezoelectric element and therefore are not affected by these deposition temperatures.

The transfer of the piezoelectric element from the first substrate on the second substrate with the presence of the first cavity already present when the piezoelectric element is fastened to the second substrate further makes it possible to avoid the making of release holes through the piezoelectric element. The stiffness of the piezoelectric element is therefore not reduced because of such release holes. This absence of release holes through the piezoelectric element also makes it possible to prevent a concentration of residual stresses between the release holes which could cause local modifications in the initial direction of magnetisation of the magnetic element or elements, and therefore a drop in the permeability of this or these magnetic elements.

In addition, the surface of the first and second faces of the piezoelectric element is not reduced by the presence of these holes, which increases the reception surface for the magnetic element or elements when this or these magnetic elements are made against the piezoelectric element.

The presence of the first cavity under the piezoelectric element allows the piezoelectric element to be deformed and as such, according to the value of the voltage to which the piezoelectric element is subjected, to generate a stress in the magnetic element. The magnetic element, which forms the magnetic core of the device, is able to be deformed under the solicitation of the piezoelectric element. The magnetic permeability of the magnetic element therefore varies according to the mechanical stresses that are applied to it by the piezoelectric element.

Contrary to a bulk piezoelectric substrate, using the suspended piezoelectric element makes it possible to create a stress from a low actuating voltage (for example up to approximately 20 V) applied to the terminals of the piezoelectric element.

The piezoelectric element may be chosen such that the mechanical stress generated by this element is uniaxial, i.e. oriented according to a single axis, which makes it possible to control the variations in the inductance of the device because the variations in the permeability of the magnetic element are in this case well controlled. Such a piezoelectric element comprises for example PZT which is furthermore compatible with a thin layer deposition. Other materials may be used in order to make the piezoelectric element, such as for example AlN, PMN-PT, ZnO, $LiNbO_3$.

The magnetic device is qualified as an "integrated" device because it is made by means of the deposition of thin layers on at least one substrate, i.e. is made totally or partially by integrated or hybrid manufacturing techniques from microelectronics.

The expression "arranged against", or "made against", used in this document must be understood as able to correspond to a contact direct between the two elements arranged one against the other, or as able to correspond to an indirect contact between these elements, i.e. with one or several other intermediate materials between these elements such as for example an electrical insulation between the electrical element and the conductive element.

The term "magnetic" is used in this document to designate an element or a material that has ferromagnetic or antiferromagnetic properties.

According to a first embodiment, the method may be such that:
during the step b), the first electrically conductive element is made at least partially against the first face of the piezoelectric element, then the second substrate is fastened to the ends of the piezoelectric element such that the first electrically conductive element is arranged in the first cavity;
during the step d), the second electrically conductive element is made at least partially against the second face of the piezoelectric element.

This first embodiment makes it possible to prevent the making of resumed electrical contact between the various substrates because the electrically conductive elements are made on the piezoelectric element. The electrical and/or magnetic connection or connections between the first and second electrically conductive elements may be made through and/or next to piezoelectric and magnetic elements.

In this case, the fastening of the ends of the piezoelectric element to the second substrate may be implemented at a temperature less than approximately 300'C and by the intermediary of a bonding element comprising at least one polymer. In this case, the method does not require the implementation of a conductive sealing, which makes it possible to reduce the thermal bonding budget and to not restrict the choice of the magnetic material used to a material that is necessarily compatible with high temperatures. Such a bonding by a bonding element comprising a polymer induces practically no bonding stress of thermal origin, which is very advantageous. In addition, in light of the low temperatures called into play during the bonding, the problems of thermal expansion are also suppressed.

The bonding element may form lateral walls of the first cavity. The bonding element may in this case form a spacer that has a thickness that corresponds to at least the height of the first cavity. This prevents having to make the first cavity in the second substrate.

Alternatively, it is possible that the first cavity be formed directly by etching in the second substrate. In this case, portions of the second substrate then form practically all of the lateral walls of the first cavity.

According to a second embodiment, the method may be such that:
during the step b), the first electrically conductive element is produced in and/or against the second substrate, then the second substrate is fastened to the ends of the piezoelectric element such that the first face of the piezoelectric element is arranged facing the first electrically conductive element and spaced from the first electrically conductive element by the first cavity;
during the step d), the second electrically conductive element is produced in and/or against a third substrate, then the third substrate is fastened to the ends of the piezoelectric element such that the second face of the piezoelectric element is arranged facing the second electrically conductive element and spaced from the second electrically conductive element by a second cavity formed between the piezoelectric element and the third substrate.

In this second embodiment, the first and second electrically conductive elements are spaced from the piezoelectric element, which increases the possible variation in the inductance due to the increased dimensions with which the first and second electrically conductive elements can be made. In addition, due to the fact that the piezoelectric element can be deformed more substantially due to the absence of contact of the piezoelectric element with the electrically conductive elements, the stress generated in the magnetic element of the device is therefore more substantial.

In this case, the first and second electrically conductive elements may be electrically connected to one another by the intermediary of electrically conductive portions made in the first, second and third substrates and electrically connected together during the implementation of steps b) and d).

In addition, the fastenings of the ends of the piezoelectric element to the second and third substrates may be implemented at a temperature less than approximately 400° C. by thermocompression or eutectic sealing or direct bonding or anodic bonding. Electrically conductive sealing means are in this case used to establish the electrical connection between the first and second electrically conductive elements which are spaced from the piezoelectric element.

Generally, the making of at least one magnetic element may comprise, between the steps a) and b), the making of at least one first magnetic element against the first face of the piezoelectric element, and:
- when the first electrically conductive element is made against the first face of the piezoelectric element, the first electrically conductive element may be arranged against the first magnetic element such that the first magnetic element is arranged between the first electrically conductive element and the piezoelectric element, or
- when the first electrically conductive element is produced in and/or against the second substrate, the first cavity may be arranged between the first magnetic element and the first electrically conductive element.

Furthermore, the making of at least one magnetic element may comprise, between the steps c) and d), the making of at least one second magnetic element against the second face of the piezoelectric element, and:
- when the second electrically conductive element is made against the second face of the piezoelectric element, the second electrically conductive element may be arranged against the second magnetic element such that the second magnetic element is arranged between the second electrically conductive element and the piezoelectric element, or
- when the second electrically conductive element is made in and/or against the third substrate, the second cavity is arranged between the second magnetic element and the second electrically conductive element.

In the presence of the two magnetic elements on each side of the piezoelectric element, the volume of the magnetic core of the device is doubled with respect to a device comprising only one magnetic element located on one side of the piezoelectric element, as such increasing the performance of the inductance.

The method may further comprise, between the steps c) and d), the making of at least one electrically conductive via such as at the end of the step d), the first and second electrically conductive elements are electrically connected to one another, by said at least one electrically conductive via, in series or in parallel or such that the first and second electrically conductive elements form at least one solenoid.

The electrically conductive via or vias may be made through the piezoelectric element. The presence of this or these vias passing through the piezoelectric element is not a hindrance, contrary to the release holes, as they contribute to rigidifying the piezoelectric element and participate very little in the residual stresses.

The making of the at least one magnetic element may comprise, between the steps c) and d), the making of at least one portion of magnetic material, or magnetic via, such that at the end of the step d), the first and second electrically conductive elements are magnetically coupled to one another by said at least one portion of magnetic material. This or these portions of magnetic material form one or several magnetic vias which are subjected to the stress generated in the piezoelectric element and therefore see their permeability change. The presence of this or these magnetic vias is compatible with that of the first and/or of the second magnetic element arranged against the piezoelectric element, the device therefore able to comprise this or these magnetic vias as well as the first and/or the second magnetic element.

By connecting the first and second electrically conductive elements together magnetically, not electrically, the total length of the electrically conductive element formed around the piezoelectric element and the magnetic core is reduced (less the length of the electrical connections), which generates a smaller series resistance of the inductance.

It is also proposed an integrated magnetic device with variable inductance, comprising at least:
- a substrate;
- a piezoelectric element comprising opposite first and second faces, of which the ends are fastened to the substrate and of which the first face is arranged on the side of the substrate;
- a first cavity arranged between a portion of the substrate and the piezoelectric element;
- a first electrically conductive element arranged on the side of the first face of the piezoelectric element, and a second electrically conductive element arranged on the side of the second face of the piezoelectric element, the first and second electrically conductive elements being electrically and/or magnetically coupled to one another;
- a first magnetic element arranged against the first face of the piezoelectric element and between the piezoelectric element and the first electrically conductive element, and a second magnetic element arranged against the second face of the piezoelectric element and between the piezoelectric element and the second electrically conductive element.

The first and/or the second electrically conductive element may comprise an electrically conductive track forming meanders.

According to the first embodiment, the first electrically conductive element may be arranged at least partially against the first face of the piezoelectric element and in the first cavity, and the second electrically conductive element may be arranged at least partially against the second face of the piezoelectric element.

According to the second embodiment, the first electrically conductive element may be arranged in and/or against the substrate such that the first face of the piezoelectric element is arranged facing the first electrically conductive element and spaced from the first electrically conductive element by the first cavity, and the second electrically conductive element may be arranged in and/or against another substrate such that the second face of the piezoelectric element is arranged facing the second electrically conductive element and spaced from the second electrically conductive element by a second cavity formed between the piezoelectric element and a portion of said other substrate.

Each one of the first and second magnetic elements may comprise a stack of at least one portion of ferromagnetic material and of at least one portion of antiferromagnetic material. The magnetic elements are in this case formed of multilayers comprising an alternation of ferromagnetic layers with high magnetostriction and antiferromagnetic layers, and which have a particular behaviour at high frequency with the application of a mechanical stress. Such magnetic elements are compatible with a metal sealing implemented at a temperature that can reach 400° C. Such magnetic elements are advantageously used in the second embodiment. The stack may also comprise one or several portions of dielectric material in order to allow for laminations for high frequencies.

The device may further comprise at least one electrically conductive via electrically connecting the first and second electrically conductive elements to one another in series or in parallel or such that the first and second electrically conductive elements form at least one solenoid, and/or at least one portion of magnetic material passing through the piezoelectric element and magnetically coupling the first and second electrically conductive elements to one another.

The device may correspond to a variable inductance, an adaptable transmission line element, a tuneable resonator, an adjustable phase shifter, a controllable coupler, a variable transformer, etc.

BRIEF DESCRIPTION OF THE DRAWINGS

This invention shall be better understood when reading the description of embodiments provided solely for the purposes of information and in no way are limiting in reference to the annexed drawings wherein:

FIG. 1 diagrammatically show an integrated magnetic device with variable inductance according to a first embodiment;

FIG. 2 shows an example of an electrically conductive element of an integrated magnetic device with variable inductance;

FIGS. 3 to 6 show several examples of electrical or magnetic coupling between the electrically conductive elements of an integrated magnetic device with variable inductance according to the first embodiment;

Figure 4:
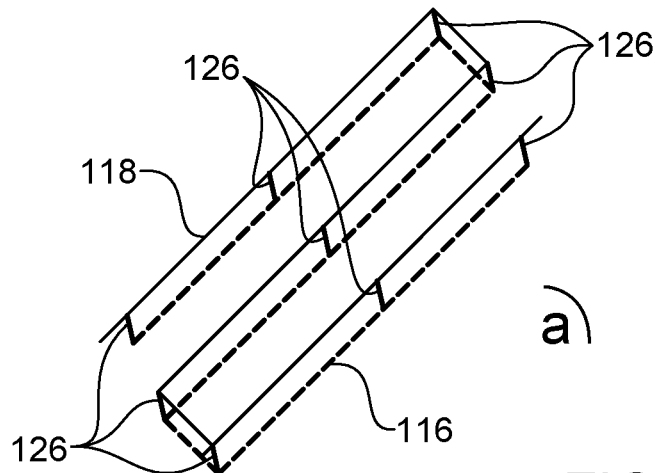
Figure 4:
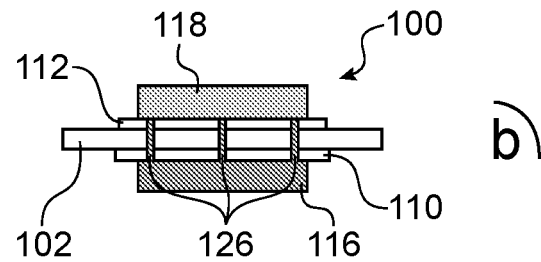

Identical, similar or equivalent portions of the various figures described hereinafter bear the same numerical references in order to facilitate the passing from one figure to the other.

The various portions shown in the figures are not necessarily shown according to a uniform scale, in order to render the figures more legible.

The various possibilities (alternatives and embodiments) must be understood as not being exclusive from one another and can be combined together.

DETAILED DISCLOSURE OF PARTICULAR EMBODIMENTS

Reference is first made to FIG. 1 which shows an integrated magnetic device 100 and with variable inductance according to a first embodiment.

The device 100 comprises a piezoelectric element 102 forming a central element of the device 100. The piezoelectric element 102 advantageously comprises PZT. Other piezoelectric materials (without lead) can however be considered to form the element 102, such as for example AlN, materials from the family of niobates (LiNbO$_3$, NaKNbO$_3$), those of the family of titanates (BaTiO$_3$, SrTiO$_3$), PMN-PT, ZnO or a combination of such materials.

The piezoelectric element 102 is here made in the form of a beam, i.e. comprises an elongated shape of which the largest dimension extends in the plane (X,Y), and parallel to the axis X in the example shown in FIG. 1. This beam has for example the form of a tensile test specimen extending parallel to the axis X (i.e. comprising its largest dimension parallel to the axis X), and comprises therefore two ends of a width (dimension according to the Y axis) that is greater than that of the rest of the beam, i.e. greater than that of a central portion of the beam. The form factor of this beam, i.e. the ratio between the length and the width, can be greater than 2, and advantageously greater than or equal to 4. The length of the beam, i.e. its largest dimension (parallel to the axis X in FIG. 1) is for example between approximately 100 μm and 500 μm.

The thickness of the piezoelectric element 102 is for example equal to approximately 400 nm, or more generally between approximately 100 nm and 5 μm.

The piezoelectric element 102 comprises a first main face 106 and a second main face 104 opposite the first face 106. These two faces 104, 106 are here parallel to the plane (X,Y).

The device 100 also comprises actuating electrodes 108 arranged against the ends of the beam formed by the piezoelectric element 102, on the first and second main faces 106, 104. An actuating voltage is intended to be applied on these actuating electrodes 108 so that deformations in compression or in traction (according to whether the voltage applied between the electrodes 108 is positive or negative), mostly uniaxial and substantially parallel to the X axis, are generated in the piezoelectric element 102. These deformations are intended to plus under stress the magnetic element or elements (described herein below). The deformation generated is here uniaxial due to the nature of the piezoelectric material used and of the form of a tensile test specimen of the piezoelectric element 102. These electrodes 108 comprise for example platinum, molybdenum, or iridium or strontium oxide.

A first magnetic element 110 is arranged against the first face 106 of the piezoelectric element 102. A second magnetic element 112 is arranged against the second face 104 of the piezoelectric element 102. The magnetic elements 110, 112 advantageously comprise similar geometrical characteristics (thickness, lateral dimensions) in order to not create any asymmetry around the piezoelectric element 102. In the first embodiment described here, the magnetic elements 110, 112 advantageously comprise the same magnetic material, for example FeCoB. Other magnetic materials can however be used to form the magnetic elements 110, 112, such as for example FeGaB or a material of the family of FeTaN, FeHfN, FeZrN. The magnetic material comprises more preferably an alloy comprising iron or iron-cobalt. The thickness of each one of the magnetic elements 110, 112 is for example equal to approximately 200 nm, or more generally between approximately 50 nm and 5 μm.

In FIG. 1, the magnetic elements 110, 112 each cover a portion only of one of the main faces 104, 106 of the piezoelectric element 102. It is however possible that the magnetic elements 110, 112 cover all or a major portion of the surface of the main faces 104, 106 which is not covered by the electrodes 108. Furthermore, several separate magnetic elements can be arranged on one or on each one of the main faces 104, 106 of the piezoelectric element 102, for example in the form of bars.

The device 100 further comprises a first electrically conductive element 116 arranged against the first face 106 of the piezoelectric element 102, and a second electrically conductive element 118 arranged against the second face 104 of the piezoelectric element 102. The electrically conductive elements 116, 118 together form a winding arranged around the magnetic core of the device 100 which is formed by the magnetic elements 110, 112, intended to store the electrical energy of the device 100. Each one of the electrically conductive elements 116, 118 corresponds, in this first embodiment, to a conductive track extending in a plane substantially parallel to the main faces 104, 106 of the piezoelectric element 102, and in the form of meanders. FIG. 2 diagrammatically shows a top view of one of the electrically conductive elements, for example the first electrically conductive element 116, comprising such a form of meanders. Advantageously, the two electrically conductive elements 116, 118 comprise a shape and dimensions that are substantially similar in order to not create any asymmetry around the piezoelectric element 102. The width of the strands of each one of the electrically conductive elements 116, 118 is for example equal to approximately 20 µm, or between approximately 5 µm and 50 µm, and the spacing between two adjacent strands is for example equal to approximately 10 µm, or between approximately 5 µm and 50 µm. The thickness of each one of the electrically conductive elements 116, 118 is for example equal to approximately 1 µm, or more generally between approximately 0.5 µm and 5 µm.

The first electrically conductive element 116 is electrically insulated from the first magnetic element 110 and from the piezoelectric element 102 by a dielectric layer 120 that covers the first magnetic element 110, the piezoelectric element 102 and the electrodes 108 on the side of the first face 106 of the piezoelectric element 102. Openings are formed through the dielectric layer 120, forming accesses to the electrodes 108 located on the side of the first face 106 of the piezoelectric element 102. Another dielectric layer 121, for example similar to the dielectric layer 120, covers the second magnetic element 112, the piezoelectric element 102 and the electrodes 108 on the side of the second face 104 of the piezoelectric element 102. This other dielectric layer 121 provides an electrical insulation function similar to that of the dielectric layer 120, i.e. used to electrically insulate the second electrically conductive element 118 with regards to the piezoelectric element 102 and the second magnetic element 112.

The electrically conductive elements 116, 118 arranged around the magnetic core formed by the magnetic elements 110, 112 make it possible, when they are passed through by an electric current, to create a magnetic field around this magnetic core, with a value of inductance varying according to the stress applied by the piezoelectric element 102 on the magnetic elements 110, 112, with the value of this stress depending on the voltage applied on the electrodes 108.

The electrically conductive elements 116, 118 comprise for example copper and/or aluminium and/or more preferably gold which has a low Young's modulus making it possible to stiffen as little as possible the piezoelectric element 102. They have for example a thickness between approximately 0.5 µm and 5 µm.

The ends of the beam corresponding to the piezoelectric element 102 are fastened, on the side of the first face 106 of the piezoelectric element 102, to a substrate 122. The substrate 122 is for example a silicon substrate. A cavity 124 is arranged between the substrate 122 and the piezoelectric element 102, wherein are arranged the elements located on the first face 106 of the piezoelectric element 102, i.e. the first magnetic element 110 and the first electrically conductive element 116. This cavity 124 provides a freedom of movement to the piezoelectric element 102 which, maintained to the substrate 122 on its ends, can be deformed and generate a stress in the magnetic elements 110, 112.

The ends of the piezoelectric element 102 can be fastened to the substrate 122 by the intermediary of a bonding element (not visible in FIG. 1), comprising for example adhesive films made of thermoplastic organic material or made of polymer.

In the device 100, the first and second electrically conductive elements 116, 118 are electrically or magnetically coupled to one another.

Openings are formed through the dielectric layers 120 and 121, the piezoelectric element 102 and possibly through one or both magnetic elements 110, 112 in order to make electrically conductive contacts and vias 126. The contacts form accesses to the electrodes 108 located on the side of the first face 104 of the piezoelectric element 102, and also form accesses to the electrodes 108 located on the side of the first face 106. These openings also make it possible to make the vias 126 that allow for the electrical contact between the electrically conductive elements 116, 118, and possibly the magnetic elements 110, 112.

FIG. 3 shows a first example of coupling between the first and second electrically conductive elements 116, 118. The view a) of this FIG. 3 shows in perspective and diagrammatically the electrically conductive elements 116, 118, the first electrically conductive element 116 being shown as a broken line and the second electrically conductive element 118 being shown as a solid line. The other elements described hereinabove of the device 100 are not shown in the view a). The view b) shows a diagrammatical cross-section view of the device 100 wherein the electrically conductive elements 116, 118, the piezoelectric element 102 and the magnetic elements 110, 112 are shown.

In this first embodiment, the electrically conductive elements 116, 118 are electrically coupled to one another, and more precisely are connected in series to one another. This series connection is obtained by making a conductive via 126 that connects one end of the first electrically conductive element 116 to an end of the second electrically conductive element 118 through the piezoelectric element 102 and possibly through one or both magnetic elements 110, 112 (through the two magnetic elements 110, 112 in the view b) of FIG. 3).

Furthermore, in the example of FIG. 3, the electrically conductive elements 116, 118 have similar shapes that, projected in the same plane parallel to the main faces 104, 106, are substantially superimposed. As such, the meanders formed by the first and second electrically conductive elements 116, 118 and the shapes of the magnetic elements 110, 112 are substantially identical on the two faces 104, 106 of the piezoelectric element 102. By connecting these meanders in series, the value of the inductance obtained by the device 100 is doubled with respect to a similar device that would comprise only a single one of the electrically conductive elements 116, 118. The total range of variation in the inductance and the quality factor obtained are not changed by making such a series connection.

FIG. 4 shows a second embodiment of coupling between the first and second electrically conductive elements 116, 118. As in FIG. 3, the view a) of FIG. 4 shows in perspective and diagrammatically the electrically conductive elements 116, 118, with the first electrically conductive element 116 being shown as a broken line and the second electrically conductive element 118 being shown as a solid line. The other elements described hereinabove of the device 100 are not shown in the view a). The view b) shows a diagrammatical cross-section view of the device 100 wherein the electrically conductive elements 116, 118, the piezoelectric element 102 and the magnetic elements 110, 112 are shown.

In this second embodiment, the electrically conductive elements 116, 118 are electrically coupled to one another, and more precisely are connected in parallel to one another. This parallel connection is obtained by making several conductive vias 126 connecting in several different points the first electrically conductive element 116 to the second electrically conductive element 118 through the piezoelectric element 102 and possibly through one or both magnetic elements 110, 112 (through the two magnetic elements 110, 112 in the view b) of FIG. 4).

As in the example of FIG. 3, the electrically conductive elements 116, 118 have here similar shapes that, projected in the same plane parallel to the main faces 104, 106, are substantially superimposed. As such, the meanders formed by the first and second electrically conductive elements 116, 118 and the shapes of the magnetic elements 110, 112 are substantially identical on the two faces 104, 106 of the piezoelectric element 102. By connecting these meanders in parallel, the value of the quality factor of the device 100 is doubled with respect to a similar device that would comprise only a single one of the electrically conductive elements 116, 118. The value and the total range of variation in the inductance are not changed by making such a parallel connection.

Figure 5:
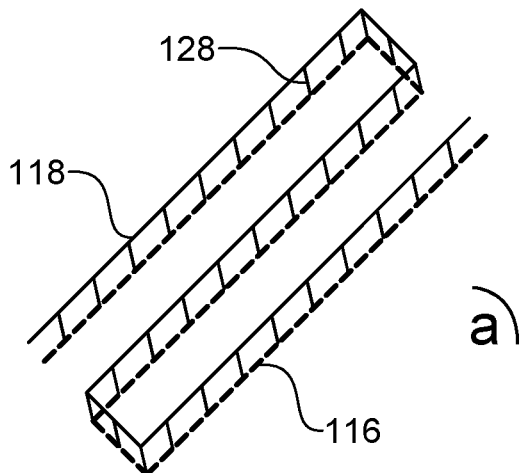
Figure 5:
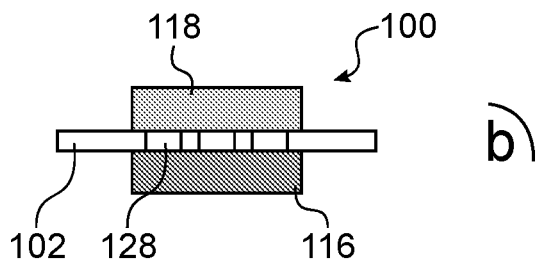

FIG. 5 shows a third embodiment of the coupling between the first and second electrically conductive elements 116, 118. As in FIGS. 3 and 4, the view a) of FIG. 5 shows in perspective and diagrammatically the electrically conductive elements 116, 118, with the first electrically conductive element 116 being shown as a broken line and the second electrically conductive element 118 being shown as a solid line. The other elements described hereinabove of the device 100 are not shown in the view a). The view b) shows a diagrammatical cross-section view of the device 100 wherein the electrically conductive elements 116, 118, the piezoelectric element 102 and the magnetic elements 110, 112 are shown.

In this third embodiment, the device 100 does not comprise the magnetic elements 110, 112 described hereinabove. The magnetic element, or magnetic core, of the device 100 is here formed by portions of magnetic material made through the entire thickness of the piezoelectric element 102 in the form of magnetic vias 128 extending between the first and second electrically conductive elements 116, 118 arranged on the main faces 104, 106 of the piezoelectric element 102. These magnetic vias 128 comprise for example FeCoB, or any other suitable magnetic material. The magnetic vias 128 are for example made by implementing a deposition, for example of the PVD (physical vapour deposition) type or IBD (ion beam deposition) type or ALD (atomic layer deposition) type, of the magnetic material, then a chemical mechanical planarization (CMP) in order to suppress the magnetic material deposited outside of the locations of the vias 128.

As in the examples in FIGS. 3 and 4, the electrically conductive elements 116, 118 here have similar shapes that, projected in the same plane parallel to the main faces 104, 106, are substantially superimposed. As such, the meanders formed by the first and second electrically conductive elements 116, 118 are substantially identical on the two faces 104, 106 of the piezoelectric element 102. By connecting these meanders by several magnetic vias 128, the values of the quality factor, of the inductance and of the total range of variation of the device 100 are increased with respect to a similar device that would comprise only a single one of the electrically conductive elements 116, 118.

Alternatively to this third embodiment, it is possible that the electrically conductive elements 116, 118 are magnetically coupled to one another by the magnetic vias 128 and also that the magnetic elements 110, 112 are present between the electrically conductive elements 116, 118 and the piezoelectric element 102.

Figure 6:
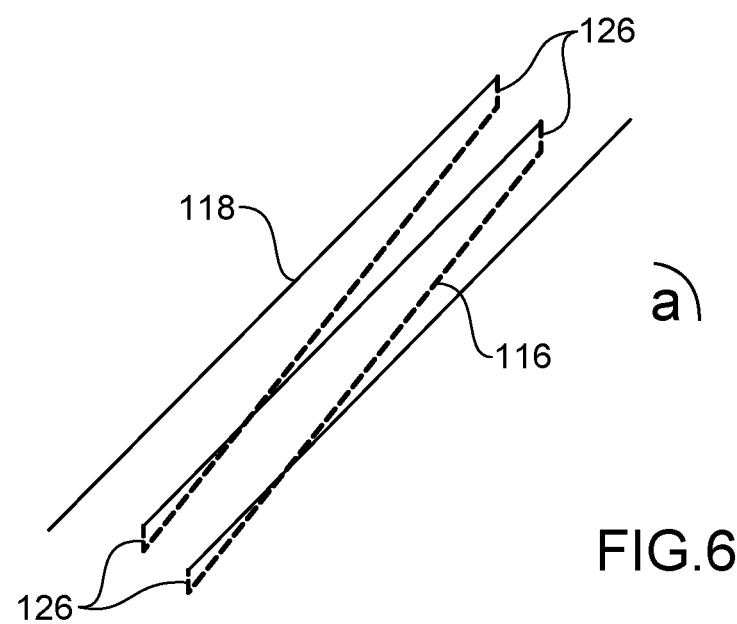
Figure 6:
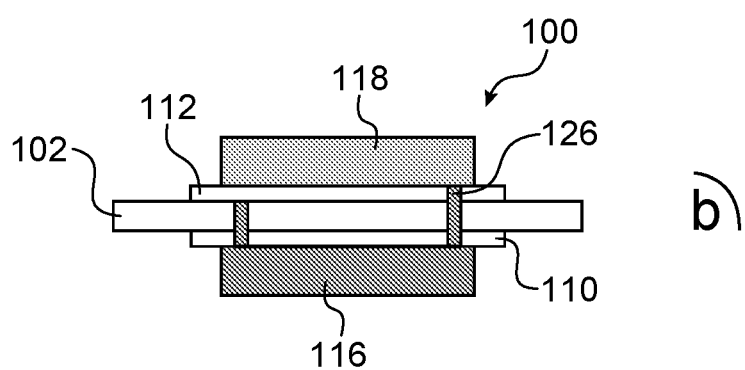

FIG. 6 shows a fourth advantageous embodiment of the coupling between the first and second electrically conductive elements 116, 118. As for FIGS. 3 to 5, the view a) of FIG. 6 shows in perspective and diagrammatically the electrically conductive elements 116, 118, with the first electrically conductive element 116 being shown as a broken line and the second electrically conductive element 118 being shown as a solid line. The other elements described hereinabove of the device 100 are not shown in the view a). The view b) shows a diagrammatical cross-section view of the device 100 wherein the piezoelectric element 102, the electrically conductive elements 116, 118 and the magnetic elements 110, 112 are shown.

In this fourth embodiment, each one of the electrically conductive elements 116, 118 comprises portions of conductive material separate from one another. These separate portions of electrically conductive elements 116, 118 are electrically coupled to one another by the electrically conductive vias 126 in such a way that the electrically conductive elements 116, 118 form a winding, or a solenoid, around the piezoelectric element 102 and magnetic elements 110, 112. Several conductive vias 126 are therefore made through the piezoelectric element 102 and possibly through one or both magnetic elements 110, 112 (through the two magnetic elements 110, 112 in the view b) of FIG. 6), with each one of the vias 126 connecting one of the portions of the first electrically conductive element 116 to one of the portions of the second electrically conductive element 118.

Contrary to the preceding embodiments, the electrically conductive elements 116, 118 do not have similar shapes, and this so that they can form a winding. In such a configuration, the range of variation in inductance is at least two times more substantial with respect to a similar device that would comprise only a single one of the electrically conductive elements 116, 118.

Other embodiments of electrically conductive elements are possible.

In all of the examples described hereinabove, each one of the magnetic elements 110, 112 present between the electrically conductive elements 116, 118 and the piezoelectric element 102 can correspond to one or several portions of magnetic material, for example in the form of a strip extending under the conductive portions of the electrically conductive elements 116, 118.

In the example of FIG. 1, the lateral walls of the cavity 124 are formed by portions of the substrate 122, due to the fact that the cavity 124 is formed by etching the substrate 122. Alternatively, it is possible that the lateral walls of the cavity 124 be formed entirely or partially by the polymer bonding element used for fastening the substrate 122.

An example of the device 100 according to the first embodiment is described herein below in reference to FIGS. 7A to 7C.

Figure 7A:
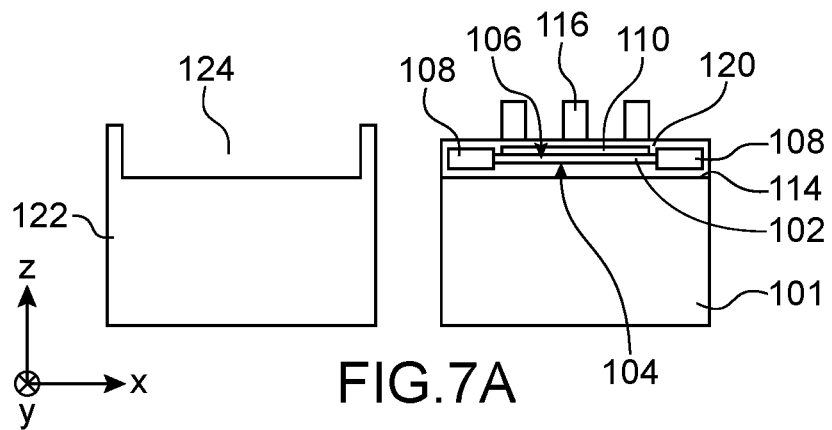
FIGS. 7A to 7C show the steps of a method for making an integrated magnetic device with variable inductance according to the first embodiment.
Figure 7B:
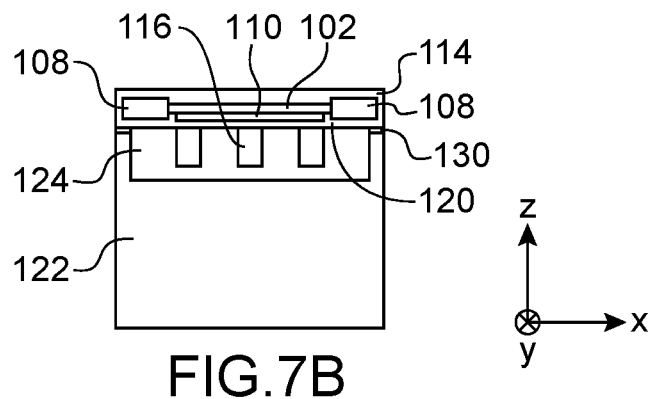
Figure 7C:
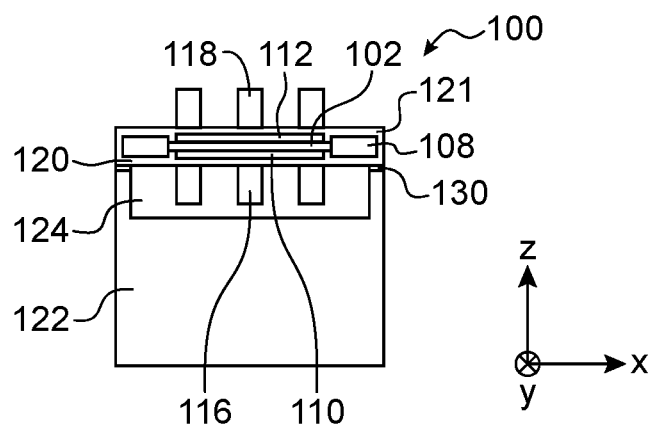
Figure 8:
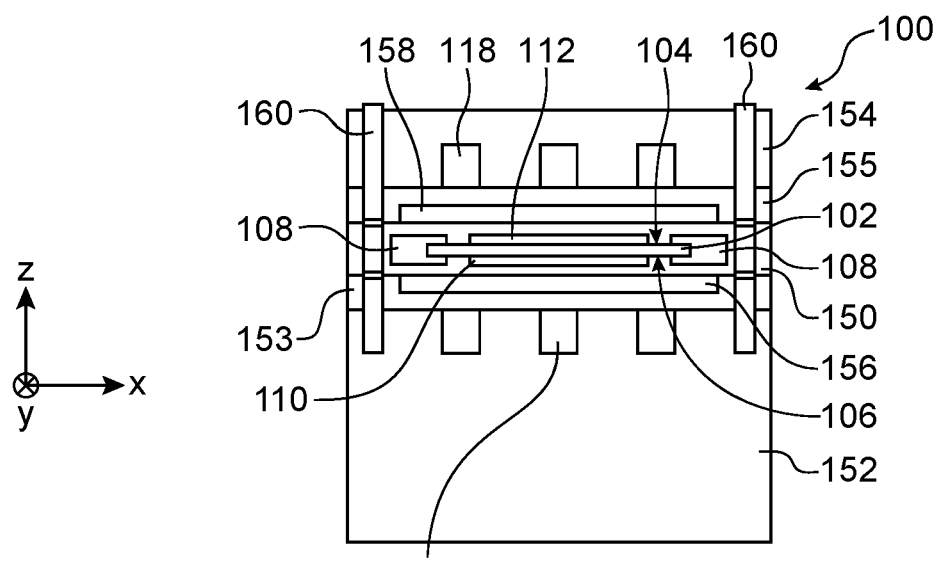
FIG. 8 diagrammatically shows an integrated magnetic device with variable inductance according to a second embodiment.
Figure 9A:
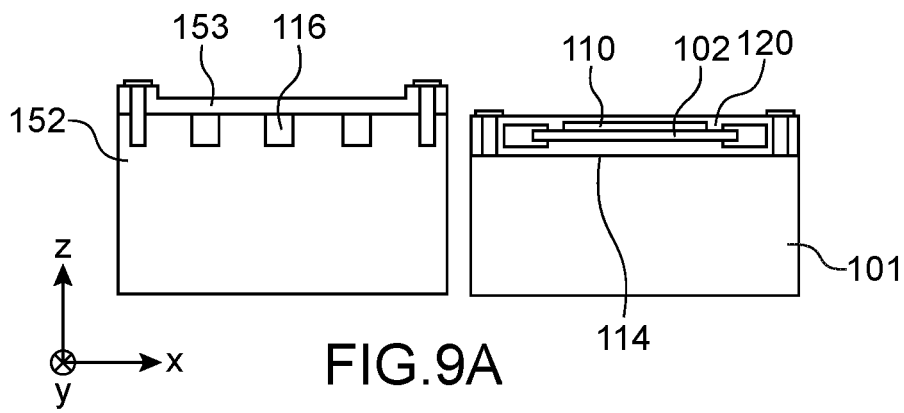
FIGS. 9A to 9D show the steps of a method for making an integrated magnetic device with variable inductance according to the second embodiment.
Figure 9B:
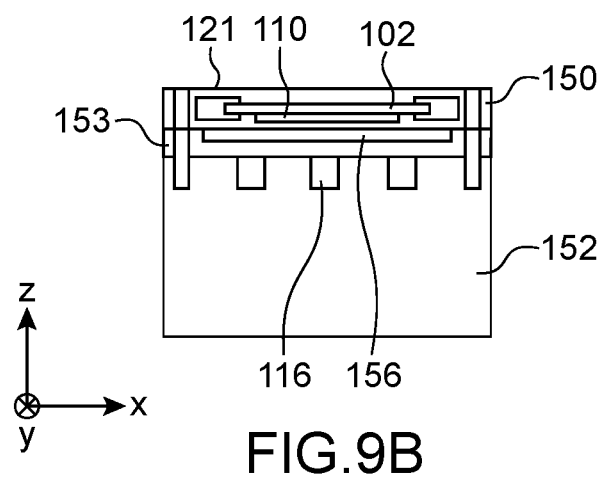
Figure 9C:
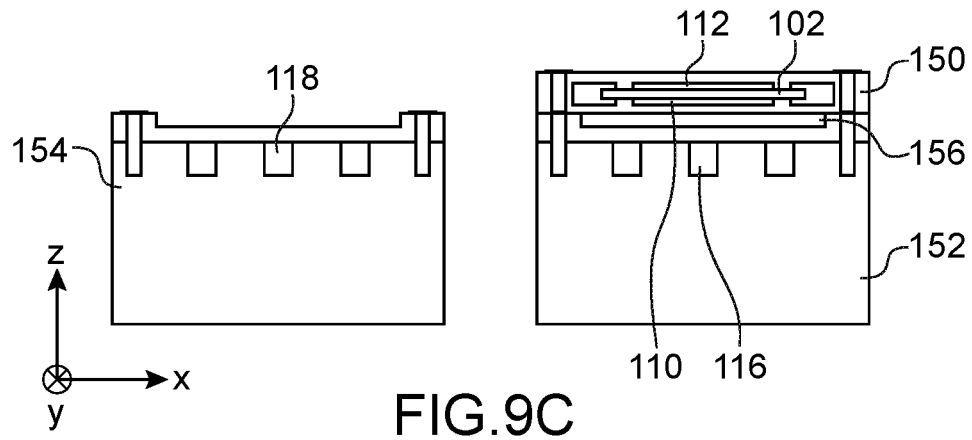
Figure 9D:
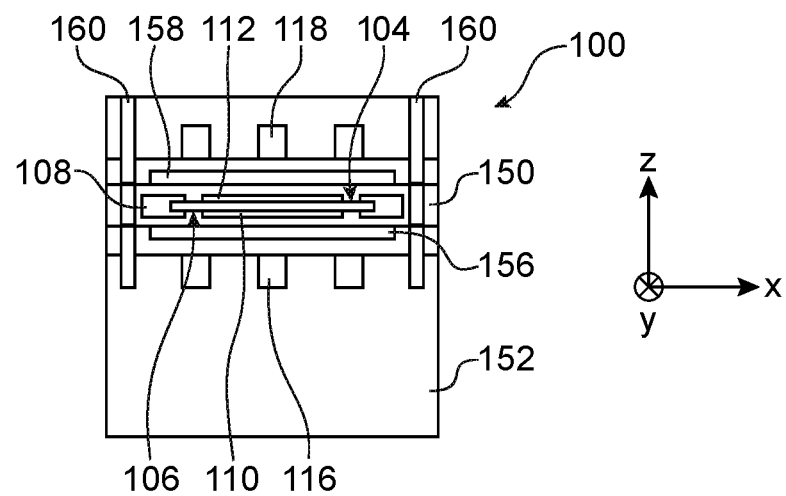

For reasons of understanding, FIGS. 7A to 7C, as well as the following FIGS. 8 to 9D show the device 100 very diagrammatically. Details on the making of the device 100 do not appear in these figures.

An etch stop layer 114 is first of all made on a front face of a first substrate 101 which is for example a silicon substrate. This layer 114 is intended to be used as an etch stop layer during the etching of the first substrate 101 from its rear face which will be implemented later. This etch stop layer 114 comprises a dielectric material, for example $SiO_2$, $ZrO_2$, or $TiO_2$, or a conductive material such as for example Ru, Pt or a metal oxide. The material of this etch stop layer is chosen such that it has a substantial etching selectivity with respect to the material of the first substrate 101. This layer is temporary and shall be removed at least partially, after the etching of the first substrate 101, in order to be able to provide for the deposition of the layer 112 as close as possible to the piezoelectric element 102.

The piezoelectric element 102 is then made on the layer 114. This making of the piezoelectric element 102 comprises for example the deposition of a layer of piezoelectric material then an etching of this layer according to the motif of the piezoelectric element 102, for example a tensile test specimen pattern, via an etching technique suitable to the piezoelectric material used. The second face 104 of the piezoelectric element 102 is located on the side of the layer 114.

Electrodes 108 are made on the first face 106 of the piezoelectric element 102, on the ends of the beam formed by the element 102.

The first magnetic element 110 is then made on the first face 106 of the piezoelectric element 102, for example by deposition and etching of one or several magnetic materials.

The dielectric layer 120 is then deposited by covering the piezoelectric element 102, the first magnetic element 110 and the electrodes 108. This dielectric layer 120 is for example deposited at low temperature by PECVD (plasma enhanced chemical vapour deposition).

The first electrically conductive element 116 is then made on the piezoelectric element 102, and more precisely on the dielectric layer 120.

In parallel to these steps, a second substrate (for example made of silicon or of glass), corresponding to the substrate 122 described hereinabove in reference to FIG. 1, is prepared in order to receive the elements made on the first substrate 101. This second substrate 122 is etched in order to form the cavity 124. Alternatively, it is possible to form the cavity 124 by a deposition of polymer on the substrate 122, then a photolithography and an etching of the cavity 124 in this polymer.

The two structures obtained at this stage of the method are shown in FIG. 7A.

A bonding is then carried out between the structure formed on the first substrate 101 and that formed from the second substrate 122. This bonding is carried out such that the first electrically conductive element 116 is arranged in the cavity 124. This bonding makes it possible to carry out a mechanical maintaining of the ends of the piezoelectric element 102 to the second substrate 122. A bead of adhesive 130 can be seen in FIG. 7B.

The mechanical maintaining of the assembly being provided by the second substrate 122, the first substrate 101 first of all is subjected via a mechanical polishing that removes a major portion of the thickness from the first substrate 101. At the end of this mechanical polishing, the remaining thickness of the first substrate is for example of about 5 μm. A chemical or plasma etching is then implemented, by using the layer 114 as an etch stop layer, in order to suppress the rest of the first substrate 101.

The layer 114 can then be partially or entirely etched at the locations intended to receive the second magnetic element 112 and everywhere outside of the electrodes 108, such as they are defined on the second face 104 of the piezoelectric element 102 (and therefore in line with the vias 126 or 128 or with certain zones of the piezoelectric element 102). The dielectric layer 121, for example of silicon oxide, is then made on the surface of the device 100 by a low-temperature deposition technique, as for the dielectric layer 120 and of the PECVD type, covering the elements made on the side of the second face 104 of the piezoelectric element 102.

Finally, the second electrically conductive element 118 is made on the piezoelectric element 102 and possibly the magnetic elements 110, 112 and the electrical vias 126 and/or the magnetic vias 128 (see FIG. 7C).

Optionally, a cover can be added on the structure made so that the second electrically conductive element 118 is encapsulated in a cavity formed by this cover, similarly to the first electrically conductive element 116. Such a cover can be formed by a third substrate for example similar to the second substrate 122.

FIG. 8 shows the magnetic device 100 according to a second embodiment.

As in the first embodiment, the magnetic device 100 comprises the piezoelectric element 102, the electrodes 108 and the magnetic elements 110, 112, for example similar to those described hereinabove in reference to the first embodiment. These elements are made on a silicon layer 150.

Contrary to the first embodiment wherein the first and second electrically conductive elements 116, 118 are made against the piezoelectric element 102 and the magnetic elements 110, 112, the electrically conductive elements 116, 118, which are insulated from one another, are here made in and/or against substrates 152, 154, for example made from silicon or from glass, separate from the layer 150 and fastened to the layer 150. A first cavity 156 is formed in a dielectric layer 153, for example made of polycrystalline silicon (by having arranged an oxide layer underneath) or made of silicon oxide, added onto the substrate 152. This first cavity 156 forms a free space between the first electrically conductive element 116 and the first magnetic element 110 arranged on the piezoelectric element 102. A second cavity 158 is formed in a layer 155, for example similar to the dielectric layer 153, added onto the substrate 154. The second cavity 156 forms a free space between the second electrically conductive element 118 and the second magnetic element 112 arranged on the piezoelectric element 102. The height of each one of the cavities 156, 158 is for example between approximately 1 μm and 10 μm.

The first and second electrically conductive elements 116, 118 are electrically connected together by electrically conductive portions 160 formed in the substrates 152, 154 and through the layers 150, 153 and 155. These electrically conductive portions 160 are fastened together at the junctions of the various elements 150, 152, 153, 154 and 155 by a conductive sealing that comprises for example a eutectic.

The first and second electrically conductive elements 116, 118 and the electrically conductive portions 160 connecting together these two elements form a winding, or a solenoid, arranged around the piezoelectric element 102, magnetic elements 110, 112 and cavities 156, 158. Contrary to the first embodiment, the winding made in this second embodiment is spaced apart from the magnetic core (i.e. without mechanical contact) formed by the magnetic elements 110, 112.

A method for making the device 100 according to the second embodiment is described herein below in reference to FIGS. 9A to 9D.

As in the first embodiment, the piezoelectric element 102 is made on the first substrate 101, by having arranged the etch stop layer 114 beforehand on the first substrate 101. The electrodes 108 are also made on the first face 106 of the piezoelectric element 102. The first magnetic element 110 is made on the first face 106 of the piezoelectric element 102. The dielectric layer 120 is then made and then planarized so as to have a surface condition with a roughness that must be very low so as to be compatible with a conductive sealing that will then be carried out. A portion of the electrically conductive portions 160 are also formed in the portion of the first substrate 101 intended to be retained in order to form the layer 150.

In parallel, the first electrically conductive element 116 is made in the substrate 152. The substrate 152 and the first electrically conductive element 116 are then covered with the dielectric material of the layer 153 wherein the first cavity 156 is made. A portion of the electrically conductive elements 160 are formed in the substrate 152 and through the layer 153.

As shown in FIG. 9B, the substrate 152 is fastened, via the layer 153, to the structure formed on the substrate 101. This sealing closes the first cavity 156. This sealing also electrically connects the electrically conductive portions 160 formed in the first substrate 101 to those formed in the substrate 152 and the layer 153.

As the mechanical maintaining being provided by the substrate 152, the first substrate 101 is then partially suppressed firstly via a mechanical polishing that removes a major portion of the thickness from the first substrate 101. At the end of this mechanical polishing, the remaining thickness of the first substrate 101 is for example about 5 µm. A chemical or plasma etching, using the layer 114 as an etch stop layer, is then implemented so that the retained portion of the first substrate 101 corresponds to the layer 150. The dielectric layer 121 is then made, as described hereinabove for the dielectric layer 120.

As shown in FIG. 9C, the second electrically conductive element 118 is made in the substrate 154. The substrate 154 and the second electrically conductive element 118 are then covered with the material of the layer 155 wherein the second cavity 158 is made. A last portion of the electrically conductive elements 160 are formed in the substrate 154 and through the layer 155.

Finally, the substrate 154 is fastened, via the layer 155, to the layer 150. The sealing which is carried out electrically connects the electrically conductive portions 160 formed in the substrate 154 and the layer 155 to those formed in the layer 150. This sealing furthermore closes the second cavity 158 and completes the making of the electrical connections that connect the electrically conductive elements 116, 118 together. The substrate 154 is then thinned to the desired thickness, and in particular so as to allow access to at least one portion of the electrically conductive portions 160 from the front face of the device 100 (FIG. 9D).

In this method forming the device 100 according to the second embodiment, the sealing techniques implemented to fasten the substrates together while still forming the electrical contacts between the various electrically conductive portions 160 are for example similar to those described in the document BAUM Mario et al., "Eutectic wafer bonding for 3-D integration", Electronic System-Integration Technology Conference (ESTC), 2010 3rd. IEEE, 2010. p. 1-6, and in the document of Sumant Sood, "Advanced Metal-Eutectic Bonding for High Volume MEMS WLP", IEEE MEMS Bay Area Meeting, 26 Feb. 2014.

The sealings implemented in this method can correspond to sealings with intermediate layers, or direct bonding.

When intermediate layers are used, the method is implemented more preferably such that the temperatures at play are between 180° C. and 450° C. It is for example possible to carry out a thermocompression of the Au—Si type, or more preferably of the Au—Au type in order to obtain a lower resistivity between the electrically conductive portions 160. Such a thermocompression can be implemented when a sealing bead with a thickness between approximately 5 µm and 100 µm is desired. Alternatively, it is possible to implement a eutectic sealing, which can be used when a sealing bead with a thickness between approximately 1 µm and 10 µm is desired. In addition, in relation to the thermocompression, the eutectic sealing makes it possible to guarantee a more substantial bonding force, which is preferable for the implementing of steps such as a CMP. The table herein below provides several examples of eutectic alloys that can be used to implement the sealings between substrates during the making of the device 100:

| Eutectic Alloy | Composition (% by weight) | Eutectic Temperature | Bonding Temperature |
| --- | --- | --- | --- |
| Au—In | 0.6/99.4 | 156° C. | 180-210° C. |
| Cu—Sn | 5/95 | 231° C. | 240-270° C. |
| Au—Sn | 80/20 | 280° C. | 280-310° C. |
| Au—Ge | 28/72 | 361° C. | 380-400° C. |
| Au—Si | 97.7/2.9 | 363° C. | 390-415° C. |
| Al—Ge | 46/51 | 419° C. | 420-450° C. |

In the table hereinabove, the Al—Ge eutectic is the one that makes it possible to obtain the lowest electrical contact resistance values, less than approximately 1 Ohm. For this Al—Ge eutectic, the aluminium comprises for example a thickness equal to approximately 1 µm and the germanium a thickness equal to approximately 0.5 µm. Generally, the ratio between the germanium thickness and the aluminium thickness is between approximately 0.5 and 0.6. With this eutectic, the sealing can be carried out at a temperature between approximately 420° C. and 450° C., with an applied pressure between approximately 15 kN and 50 kN, and for a duration between approximately 3 and 30 mn.

Whether a thermocompression or a eutectic sealing is implemented, the value of the contact resistances at the interface is lowered to a sufficiently low level, for example less than approximately 1 Ohm.

Alternatively, a direct bonding, for example Cu—Cu or Au—Au, can be implemented. In relation to the preceding sealing techniques, a direct bonding makes it possible to obtain a lower contact resistance and a greater bonding force. In addition, this direct bonding is entirely compatible with so called "mixed" surfaces, i.e. comprising electrically conductive portions and electrically insulating portions.

According to another alternative that applies to the embodiments described hereinabove, the bonding which is carried out can advantageously be a sealing on glass by direct or anodic bonding, which makes it possible to lower as much as possible the parasitic contributions of the silicon substrates used.

Figure 10:
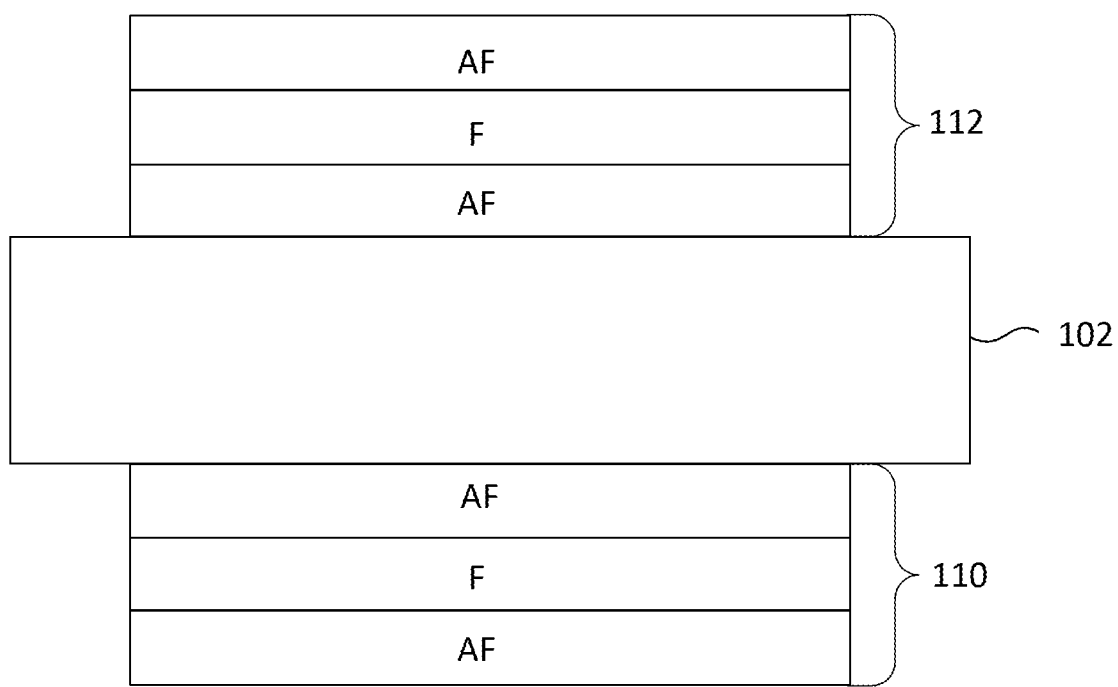
FIG. 10 shows a stack of ferromagnetic material and antiferromagnetic material.

Due to the temperatures that can be generated during the steps of sealing or of bonding implemented during the making of the device according to the second embodiment, the magnetic material used for the making of the magnetic element or elements 110, 112 of the device 100 corresponds advantageously to a magnetic material with high permeability and low losses a very high frequencies, and which is compatible with a sealing implemented at a temperature of about 400° C. Each one of the magnetic elements 110, 112 can comprise an alternation of ferromagnetic layers (F) and antiferromagnetic (AF) layers that use the property of interfacial coupling exchange between these two materials. The AF material is in general annealed under a magnetic field in order to obtain the correct phase. Such a stack of magnetic materials is for example described in document FR 2 939 990 and also illustrated in FIG. 10.

Another stack of magnetic materials that can be used pour the device 100 corresponds to that described in the document of Kevin Garello et al., "Magnetodielectric thin film heterostructure with high permeability and permittivity". IEEE Transactions on Magnetics, 2009, vol. 45, no. 10, p. 4325-4328, and which corresponds to a stack of the FeCo type (thickness of about 25 nm)/NiMn (thickness of about 30 nm)/FeCo (thickness of about 25 nm) repeated twice and annealed at 300° C. The material can then support an increase in temperature up to 400° C.

Advantageously, the stack of magnetic materials used corresponds to a stack of PtMn (thickness for example equal to approximately 30 nm) and of FeCo (thickness for example equal to approximately 20 nm), with this stack of these two materials being repeated up to 10 times and then annealed under a magnetic field at about 425° C. When this stack of magnetic materials is subjected to a later annealing at about 425° C., corresponding for example to the temperature reached during an Al—Ge sealing, these magnetic materials remain perfectly functional. This stack comprising the coupled layers of F/AF materials which is well suited for the making of the magnetic elements 110, 112 of the device 100, with the FeCo layers having high levels of magnetostriction (up to 150 ppm). The ferromagnetic material advantageously comprises Fe and/or Co, and the antiferromagnetic material advantageously comprises Mn.

The examples and types of magnetic materials described hereinabove for the making of the device 100 according to the second embodiment can also be applied for the making of the magnetic elements 110, 112 of the device 100 according to the first embodiment, and also for the making of the magnetic vias 128.

Regardless of the embodiment of the device 100, when the electrically conductive elements 116 and 118 are electrically connected together by forming a winding, or a solenoid, the turns of this winding can be oriented parallel or perpendicular to the axis of deformation of the piezoelectric element 102. However, the orientation of these turns is chosen by taking account of the axis of anisotropy of the magnetic material, i.e. the direction of easy magnetisation for a ferromagnetic material or the direction of trapping for a ferromagnetic/antiferromagnetic stack, with this axis of anisotropy being oriented parallel to the turns so that an oscillating torque is exerted on the magnetic moments. As such, the axis of easy magnetisation, or the direction of trapping, can be in a first case parallel to the stress generated by the piezoelectric element 102, or in a second case perpendicular to this stress.

In this first case, there is only one balanced position (energy minimum) that corresponds to the alignment of all of the magnetic moments according to the direction of the stress applied. It is the most stable configuration in operation and the least sensitive to manufacturing imperfections (misalignment and residual stress of the magnetic element 110 or 112). In other terms, the direction of magnetisation never deviates from the axis of the beam or from the alignment with the turns.

In this second case, when the magnetic material is ferromagnetic with uniaxial anisotropy (for example FeCoB), there are only two balanced positions: an initial position (0°) which corresponds to the axis of anisotropy of the magnetic material oriented perpendicularly to the stress, and a final position (90°) which corresponds to the alignment of all of the magnetic moments according to the direction of the stress applied. There is no intermediate angular position. To such a point that the action of the stress exerted by the piezoelectric element 102 on this magnetic material has for effect in fine to switch the direction of magnetisation between these two states only. After switching, the initial functionality of the variable inductance is lost.

In this second case, when the magnetic element is a stack of F/AF materials with unidirectional anisotropy, there is an infinity of balanced positions between 90° (initial position) and 0° (final position). For each value of electrical voltage (or electric field E) applied to the piezoelectric element 102, then magnetisation rotates by a determined angle, from the initial position at 90° to the final position at 0°. The device 100 makes use in this case of the angular dependency of the tensor of the high-frequency permeability that is valid only for the F/AF layers due to the unidirectional nature of the anisotropy.

Using a stack of F/AF layers is very advantageous with respect to the single layers F. Indeed, the residual stresses from manufacturing will here introduce simply an angular offset (this will start from 90° but not 80° for example) but the functionality of the variable inductance is retained until 0°.

The invention claimed is:

1. An integrated magnetic device with variable inductance, the device comprising:
   a substrate;
   a piezoelectric element comprising opposite first and second faces, of which the ends are fastened to the substrate and of which the first face is arranged on the side of the substrate, the piezoelectric element including an absence of release holes through the piezoelectric element;
   a first cavity arranged between a portion of the substrate and the piezoelectric element;
   a first electrically conductive element arranged on the side of the first face of the piezoelectric element, and a second electrically conductive element arranged on the side of the second face of the piezoelectric element, the first and second electrically conductive elements being electrically and/or magnetically coupled to one another;
   a first magnetic element arranged against the first face of the piezoelectric element and between the piezoelectric element and the first electrically conductive element, and a second magnetic element arranged against the second face of the piezoelectric element and between the piezoelectric element and the second electrically conductive element.

2. The device according to claim 1, wherein the first and/or the second electrically conductive element comprises an electrically conductive track forming meanders.

3. The device according to claim 1, wherein the first electrically conductive element is arranged at least partially against the first face of the piezoelectric element and in the first cavity, and wherein the second electrically conductive element is arranged at least partially against the second face of the piezoelectric element.

4. The device according to claim 1, wherein the first electrically conductive element is arranged in and/or against the substrate such that the first face of the piezoelectric element is arranged facing the first electrically conductive element and spaced from the first electrically conductive element by the first cavity, and wherein the second electrically conductive element is arranged in and/or against another substrate such that the second face of the piezoelectric element is arranged facing the second electrically conductive element and spaced from the second electrically conductive element by a second cavity formed between the piezoelectric element and a portion of said other substrate.

5. The device according to claim 1, wherein each one of the first and second magnetic elements comprises a stack of at least one portion of ferromagnetic material and of at least one portion of antiferromagnetic material.

6. The device according to claim 1, further comprising:
- at least one electrically conductive via electrically connecting the first and second electrically conductive elements to one another in series or at least one portion of magnetic material passing through the piezoelectric element and magnetically coupling the first and second electrically conductive elements to one another.

7. The device according to claim 1, further comprising:
- at least one electrically conductive via electrically connecting the first and second electrically conductive elements to one another in series, and
- at least one portion of magnetic material passing through the piezoelectric element and magnetically coupling the first and second electrically conductive elements to one another.

* * * * *